United States Patent
Aoyagi et al.

(10) Patent No.: US 8,750,881 B2
(45) Date of Patent: Jun. 10, 2014

(54) MOBILE COMMUNICATION METHOD AND RADIO BASE STATION

(75) Inventors: Kenichiro Aoyagi, Yokosuka (JP); Yasuhiro Kawabe, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 437 days.

(21) Appl. No.: 13/130,405

(22) PCT Filed: Nov. 20, 2009

(86) PCT No.: PCT/JP2009/069711
§ 371 (c)(1),
(2), (4) Date: Jul. 20, 2011

(87) PCT Pub. No.: WO2010/058841
PCT Pub. Date: May 27, 2010

(65) Prior Publication Data
US 2011/0275347 A1    Nov. 10, 2011

(30) Foreign Application Priority Data
Nov. 20, 2008   (JP) ................. 2008-297143

(51) Int. Cl.
*H04W 36/00* (2009.01)
*H04W 40/00* (2009.01)

(52) U.S. Cl.
USPC ............ 455/443; 455/444; 455/446; 455/447

(58) Field of Classification Search
CPC .................................................. H04W 84/045
USPC ......................................................... 455/443
See application file for complete search history.

(56) References Cited

U.S. PATENT DOCUMENTS 8,204,506 B2 *   6/2012   Lindqvist et al. ............. 455/450
8,494,530 B2 *   7/2013   Karaoguz et al. ............. 455/439

FOREIGN PATENT DOCUMENTS

| JP | 2002 262359 | 9/2002 |
| JP | 2002 345021 | 11/2002 |
| JP | 2006 203507 | 8/2006 |
| JP | 2007 134794 | 5/2007 |

* cited by examiner

*Primary Examiner* — Huy C Ho
(74) *Attorney, Agent, or Firm* — Oblon, Spivak, McClelland, Maier & Neustadt, L.L.P.

(57) ABSTRACT

A mobile communication method comprises a step of setting a restriction type by the femtocell radio base station #A in response to input of predetermined information to the femtocell radio base station #A, the restriction type indicating restricted processes to be applied to a mobile station UE belonging to the CSG #1 in the femtocell #1; a step B of notifying a mobile station UE in the femtocell #1 of the set restriction type by the femtocell radio base station #1; and a step of detecting processes restricted in the femtocell #1 on the basis of the notified restriction type, in a case where the mobile station UE belongs to the CSG #1.

12 Claims, 5 Drawing Sheets

FIG. 3

| RESTRICTION TYPE | LOCATION REGISTRATION (Attach) | CS OUTGOING CALL (ALL) | CS OUTGOING CALL (PARTIAL) | CS INCOMING CALL (ALL) | CS INCOMING CALL (PARTIAL) | PS OUTGOING CALL (ALL) | PS OUTGOING CALL (PARTIAL) | PS INCOMING CALL (ALL) | PS INCOMING CALL (PARTIAL) | ... |
|---|---|---|---|---|---|---|---|---|---|---|
| A | ○ | ○ | — | ○ | — | ○ | — | ○ | — | ... |
| B | ○ | × | ○ | × | ○ | × | ○ | × | ○ | ... |
| ... | ... | ... | ... | ... | ... | ... | ... | ... | ... | ... |

| CSG | RESTRICTION TYPE |
|---|---|
| #1 | #A |
| #2 | #B |
| ⋮ | ⋮ |

MOBILE COMMUNICATION METHOD AND RADIO BASE STATION

TECHNICAL FIELD

The present invention relates to a mobile communication method and a radio base station.

BACKGROUND ART

In conventional mobile communication systems, mainly for the purpose of covering coverage holes, macrocells are arranged by communication carriers so as to cover as wide areas as possible on the basis of a prediction result of the amount of communication traffic or the like.

SUMMARY OF THE INVENTION

Problems to be Solved by the Invention

In recent years, there has been a demand to bar and restrict incoming and outgoing call processes in specific areas such as areas around bank ATMs, areas inside examination rooms, hospitals and train cars, and the like.

In order to meet such a demand, however, the conventional mobile communication systems have to implement countermeasures such as a change in the arrangement of the macrocells which involves reinstallation of the macrocell radio base stations; restricted processes in the macrocell radio base stations, which is to be applied in times of disaster; and blocking of radio waves in the specific areas. For this reason, there arises a problem that the conventional mobile communication systems cannot satisfy such a demand flexibly.

In addition, mobile communication systems employing the WCDMA scheme adopt a configuration in which the result of restricted processes are notified through broadcast information in each cell.

Here, the problem in this case is that a mobile station UE attempting to perform a handover from a macrocell to a femtocell cannot know the result of restricted processes in the femtocell until the mobile station UE moves to the femtocell.

In this respect, the present invention has been made in view of the aforementioned problems, and an objective of the present invention is to provide a mobile communication method and a radio base station which are capable of easily barring and restricting incoming and outgoing call processes in a specific area (for example, a femtocell) before movement to the specific area.

Means for Solving the Problems

A first aspect of the present invention is summarized as a mobile communication method comprising: a step A of setting a restricted process by a radio base station in response to input of predetermined information to the radio base station by a user, the restricted process being to be applied to a mobile station belonging to a first group in a first cell; a step B of notifying a mobile station located in the first cell of the set restricted process by the radio base station; a step C of detecting a process restricted in the first cell on the basis of the notified restriction type by the mobile station, in a case where the mobile station belongs to the first group; and a step D of, upon detection of a second cell under the control of a specific radio base station, setting by the radio base station a frequency used in the second cell as a frequency used in the first cell.

A second aspect of the present invention is summarized as a radio base station comprising: a setting unit configured to set a restricted process in response to input of predetermined information to the radio base station by a user, the restricted process being to be applied to a mobile station belonging to a first group in a first cell; a notification unit configured to notify a mobile station located in the first cell of the set restricted process; and a restriction cell automatic setting unit configured to, upon detection of a second cell under the control of a specific radio base station, set a frequency used in the second cell as a frequency used in the first cell.

Advantageous Effects of the Invention

As described above, according to the present invention, it is possible to provide a mobile communication method and a radio base station which are capable of easily barring and restricting incoming and outgoing call processes in a specific area (for example, a femtocell) before transferring to the specific area.

BRIEF DESCRIPTION OF DRAWINGS

FIG. 3 is a diagram showing an example of restriction information managed by the mobile station according to the first embodiment of the present invention.

EMBODIMENTS FOR CARRYING OUT THE INVENTION (Configuration of Mobile Communication System According First Embodiment of the Present Invention)

The configuration of a mobile communication system according to a first embodiment of the present invention will be described with reference to FIG. 1 to FIG. 5. The mobile communication system according to the embodiment may be an LTE (Long Term Evolution) mobile communication system or a WCDMA mobile communication system.

Figure 1:
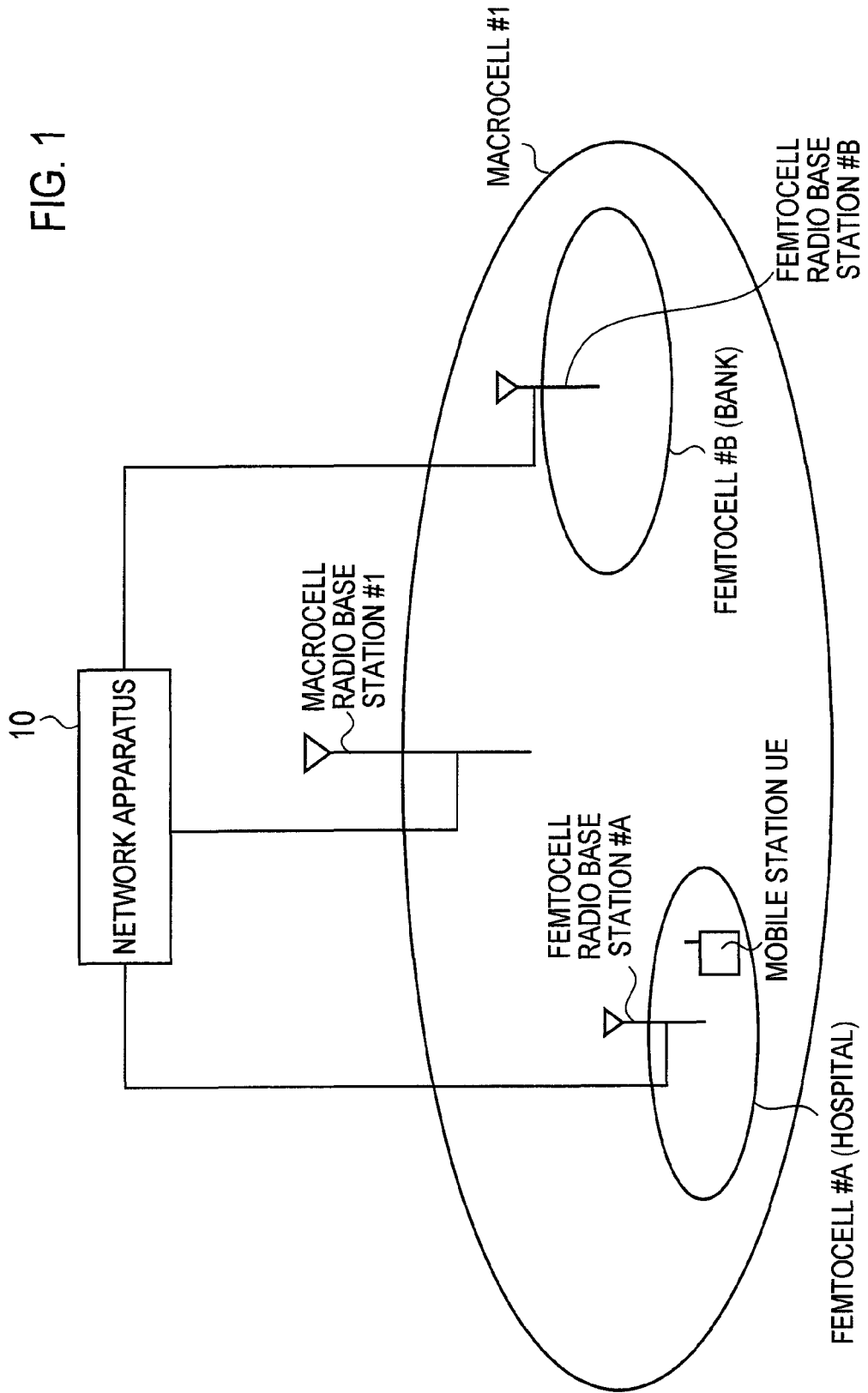
FIG. 1 is an overall configuration diagram of a mobile communication system according to a first embodiment of the present invention.

As shown in FIG. 1, the mobile communication system according to the embodiment includes: a network apparatus 10; a macrocell radio base station #1 configured to manage a macrocell #1; a femtocell radio base station #A configured to manage a femtocell #A; and a femtocell radio base station #B configured to manage a femtocell #B.

In the example shown in FIG. 1, the femtocell #A is arranged in a hospital, and the femtocell #B is arranged in the area around a bank ATM. In addition, the femtocell #A, and the femtocell #B are arranged in the macrocell #1.

Note that, this mobile communication system employs a configuration in which a femtocell is arranged in a specific area such as the area around a bank ATM, or an area inside an examination room, a hospital or a train car within a macrocell or outside the macrocell.

In addition, the network apparatus 10 may be a mobile management entity MME or the like in a case where the mobile communication system according to the embodiment is an LTE mobile communication system. Moreover, the network apparatus 10 may be a radio network controller RNC, a mobile switching center MSC/SGSN or the like in a case where the mobile communication system according to the embodiment is a WCDMA mobile communication system. In addition, the network apparatus 10 may be a server apparatus connected to a PS network such as the Internet.

Figure 2:
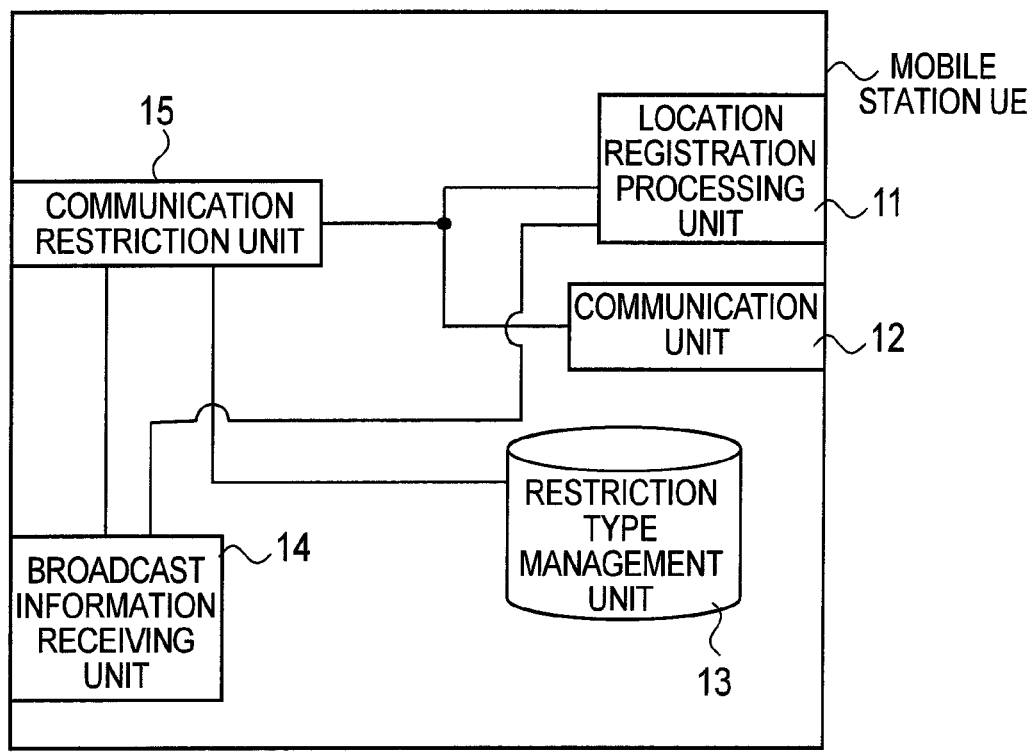
FIG. 2 is a functional block diagram of a mobile station according to the first embodiment of the present invention.

As shown in FIG. 2, the mobile station UE includes a location registration process unit 11, a communication unit 12, a restriction type management unit 13, a broadcast information receiving unit 14 and a communication restriction unit 15. Here, in this embodiment, an assumption is made that the mobile station UE belongs to a CSG (Closed Subscriber Group) #1 and is located within the femtocell #A, unless otherwise noted.

The location registration process unit 11 is configured to perform a location registration process (attach process) for a cell satisfying a predetermined condition among multiple cells (macrocell or femtocell) that have detected broadcast information, and then to perform a standby process in the cell.

Here, the location registration process unit 11 may be configured to perform the location registration process preferentially for a femtocell when detecting multiple cells including the femtocell. For example, the location registration process unit 11 is configured to perform the location registration process for a femtocell whenever detecting the femtocell.

However, the location registration process unit 11 is configured not to perform the location registration process for the detected femtocell #A in a case where the location registration process is restricted for the CSG #1 in the femtocell #1.

Moreover, the location registration process unit 11 may be configured to acquire a restriction type in a procedure of the location registration process for the femtocell #A, the restriction type indicating the restricted processes to be applied to a mobile station belonging to the CSG #1 in the femtocell #A.

Here, the restriction type indicates restricted processes to be applied to a mobile station belonging to a predetermined CSG in a predetermined femtocell.

The communication unit 12 is configured to perform communication processes (outgoing call process and incoming call process, for example) of circuit switch (CS) and packet switch (PS) in a femtocell and a macrocell.

However, the communication unit 12 is configured not to perform predetermined communication processes for the detected femtocell #A in a case where the communication restriction unit 15 restricts the predetermined communication processes (all CS outgoing call processes, for example) for the CSG #1 in the femtocell #A.

The restriction type management unit 13 is configured to manage the restricted processes indicated by each restriction type. Here, the restriction type management unit 13 may be configured to change the restricted processes indicated by each restriction type, in accordance with an instruction from the network apparatus 10 or the femtocell radio base station #A.

In the example of FIG. 3, a restriction type A indicates that no restricted process exists, while a restriction type B indicates that all the incoming and outgoing call processes except for the location registration process and the incoming and outgoing call processes for a specific communication destination (CS/PS incoming and outgoing call processes) are as the restricted processes.

The broadcast information receiving unit 14 is configured to receive broadcast information from a neighbor cell (macrocell or femtocell). Here, the broadcast information receiving unit 14 may be configured to notify the location registration process unit 11 of information on the cell from which the broadcast information receiving unit 14 has received the broadcast information.

In addition, the broadcast information receiving unit 14 may be configured to acquire a restriction type indicating the restricted processes to be applied to a mobile station belonging to the CSG #1 in the femtocell #A which is the notification source of the received broadcast information.

In accordance with the restriction types managed by the restriction type management unit 13 and the restriction type acquired by the location registration process unit 11 or the broadcast information receiving unit 14, the communication restriction unit 15 detects the processes restricted for the mobile station belonging to the CSG #1 in the femtocell #A and instructs the location registration process unit 11, the communication unit 12 or the like not to perform each process.

For example, in a case where the location registration process unit 11 or the broadcast information receiving unit 14 acquires the "restriction type A" as the restriction type of the CSG to which the mobile station UE belongs in the femtocell where the mobile station UE exists, the communication restriction unit 15 detects that there is no process restricted for a mobile station UE belonging to the CSG #1 in the femtocell #A and thus does not instruct the location registration process unit 11, the communication unit 12 or the like not to perform each process.

In addition, in a case where the location registration process unit 11 or the broadcast information receiving unit 14 acquires the "restriction type B" as the restriction type of the CSG to which the mobile station UE belongs in the femtocell where the mobile station UE exists, the communication restriction unit 15 detects the CS/PS incoming and outgoing call processes for all the communication destinations as the processes restricted for the mobile station belonging to the CSG #1 in the femtocell #A and then instructs the communication unit 12 not to perform the CS/PS incoming and outgoing call processes except for CS/PS incoming and outgoing call processes for a specific communication destination.

Here, the configurations of the femtocell radio base station #A, and the femtocell radio base station #B shown in FIG. 1 are basically the same. Thus, the configurations of the two radio base stations are described as the configuration of a femtocell radio base station 20.

Here, a small radio base station installed by a user subscribing a service of a communication carrier can be cited as a representative of the femtocell radio base station 20 according to the present embodiment. However, any radio base station is applicable to the femtocell radio base station 20 regardless of the installation personnel and the size (for example, home radio base station "Home NodeB" or "Home eNB" or the like) as long as the radio base station includes the configuration described in this embodiment.

Figures 4, 5:
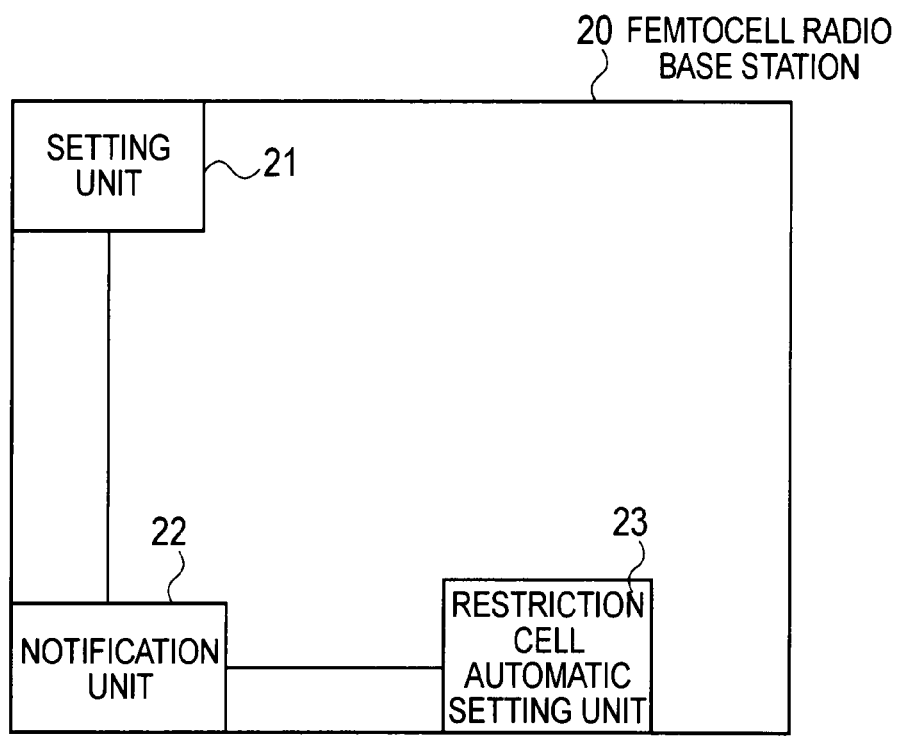
FIG. 4 is a functional block diagram of a femtocell radio base station according to the first embodiment of the present invention.
FIG. 5 is a diagram showing an example of restriction information set by the femtocell radio base station according to the first embodiment of the present invention.

As shown in FIG. 4, the femtocell radio base station 20 includes a setting unit 21, a notification unit 22 and a restriction cell automatic setting unit 23.

The setting unit 21 is configured to set of a restriction type in response to input of predetermined information (input of information by operating a predetermined screen or pressing a button or the like, for example) to the femtocell radio base station 20 by the user. Here, the restriction type indicates the restricted processes to be applied to a mobile station UE belonging to a predetermined CSG (first group) in a femtocell under the control of the femtocell radio base station 20.

For example, the user may set a restriction type not including the location registration process as the restricted process.

In addition, as shown in FIG. 5, the user may set the restriction type A not indicating all the processes as the restricted processes for a mobile station UE belonging to the CSG #1 in a femtocell under the control of the femtocell radio base station 20. The user may set the restriction type B indicating all the incoming and outgoing call processes except for the location registration process and the incoming and outgoing call processes for a specific communication destination (CS/PS incoming and outgoing call processes), as the restricted processes for a mobile station UE belonging to the CSG #2 in a femtocell under the control of the femtocell radio base station 20.

Specifically, the user is allowed to set restriction types indicating different restricted processes for mobile stations UE belonging the different CSGs #1 and #2 in a femtocell under the control of the femtocell radio base station 20.

The notification unit 22 is configured to notify a mobile station UE located in the femtocell under the control of the femtocell radio base station 20 of the set restriction type.

Here, the notification unit 22 may be configured to notify the mobile station UE of the aforementioned restriction type through broadcast information.

In addition, the notification unit 22 may be configured to notify the mobile station UE of the aforementioned restriction type during the location registration process in a case where the setting unit 21 does not set the location registration process as the aforementioned restricted process.

Moreover, the notification unit 22 may be configured to notify a mobile station UE belonging to a different CSG in a femtocell under the control of the femtocell radio base station 20 of a restriction type indicating different restricted processes.

The restriction cell automatic setting unit 23 is configured to set a frequency f1 used in a macrocell #1 to be the frequency used in a femtocell under the control of the femtocell radio base station 20, when detecting the macrocell (second cell) #1 under the control of the macrocell radio base station (specific radio base station) #1.

Here, the restriction cell automatic setting unit 23 may be configured to automatically detect the macrocell (second cell) #1 under the control of the macrocell radio base station #1 by the PnP (plug and play) function.

(Operation of Mobile Communication System According to First Embodiment of the Present Invention)

The operation of the mobile communication system according to the first embodiment of the present invention will be described with reference to FIG. 6.

Here, an assumption is made that a femtocell #20 managed by the femtocell radio base station #20 is arranged in the specific area, where the incoming and outgoing call processes is desired to be restricted, such as an area around a bank ATM or an area inside an examination room, a hospital or a train car.

In addition, an assumption is made that the femtocell radio base station 20 notifies a mobile station located in the femtocell #20 of a restriction type indicating that all the incoming and outgoing call processes except for the location registration process are restricted for all the CSGs except for a CSG to which a specific mobile station belongs.

Figure 6:
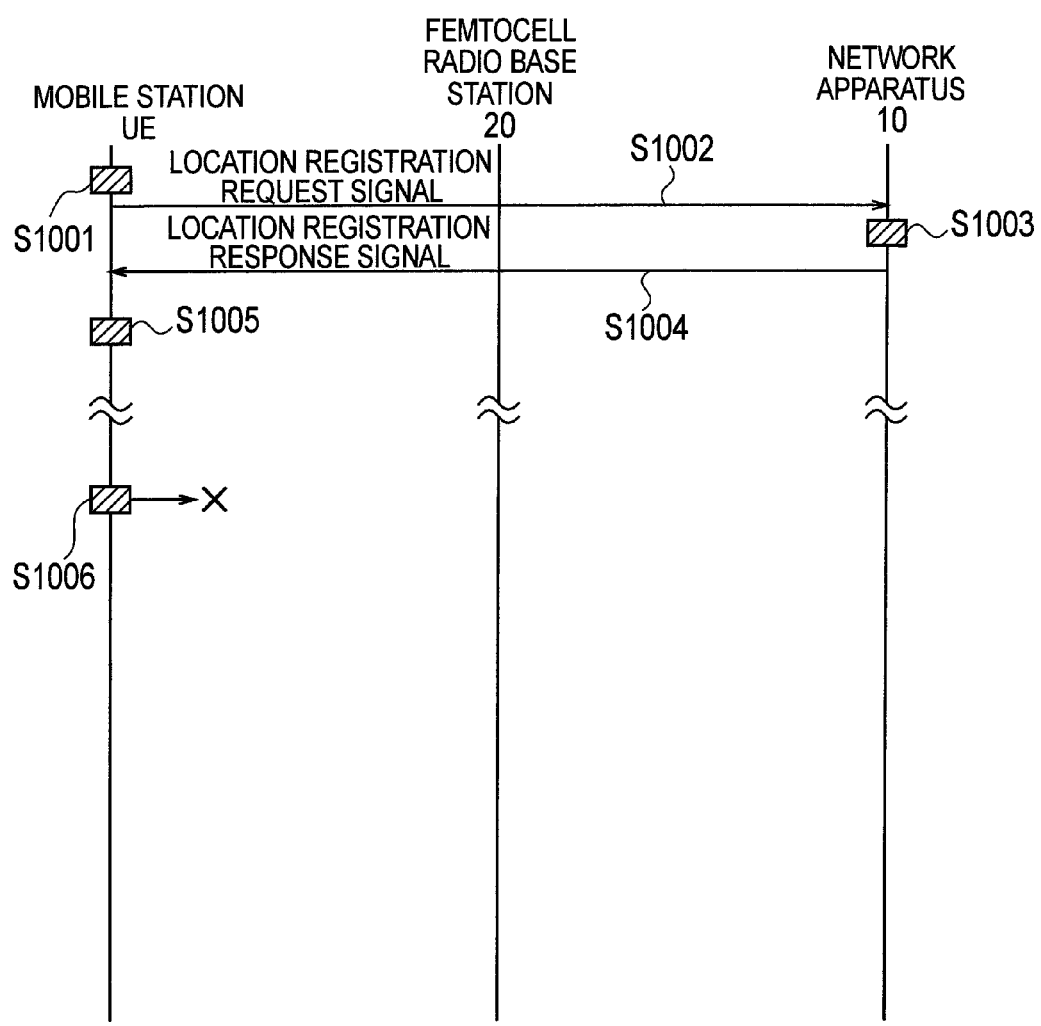
FIG. 6 is a sequence diagram showing an operation of the mobile communication system according to the first embodiment of the present invention.

As shown in FIG. 6, a mobile station UE located in the femtocell #20 detects the femtocell #20 by receiving broadcast information and then detects that the location registration process is not restricted for a CSG to which the mobile station UE belongs in the femtocell #20 in step S1001. Then, the mobile station UE transmits to the network apparatus 10 a location registration request signal for requesting the location registration process for the femtocell #20 in step S1002.

In step S1003, the network apparatus 10 performs the location registration process of the mobile station UE for the femtocell #20. Then, in step S1004, the network apparatus 10 transmits to the mobile station UE a location registration response signal for notifying the mobile station UE that the location registration process is completed.

In step S1005, the mobile station UE starts standby processing in the femtocell #20.

Thereafter, in step S1006, when detecting a trigger for performing CS/PS incoming and outgoing call processes, the mobile station UE determines that the CS/PS incoming and outgoing call processes cannot be performed, in accordance with the aforementioned restriction type, and thus does not perform the CS/PS incoming and outgoing call processes.

Note that, a mobile station performing standby in a macrocell can receive a public communication service and thereby perform the CS/PS incoming and outgoing call processes without being affected by the aforementioned restricted processes.

(Operational Effects of Mobile Communication System According to First Embodiment of the Present Invention)

With the mobile communication system according to the first embodiment of the present invention, input of predetermined information by the user (installation personnel or owner of the femtocell radio base station 20, for example) by operating a predetermined screen or pressing a button or the like for the femtocell radio base station 20 alone allows the user to freely set restricted processes to be applied to a mobile station belonging to a predetermined CSG in the femtocell #20 under the control of the femtocell radio base station 20. Here, the restricted processes can be set without involving: a change in the arrangement of the macrocell, which involves reinstallation of the macrocell radio base station; restricted processes in the macrocell radio base station, which are applied in times of disaster; blocking of radio waves in a specific area; and the like.

Specifically, with the mobile communication system according to the first embodiment of the present invention, it is possible to set desired restricted processes without performing a complicated procedure to be performed by a communication carrier, namely, access restriction setting in the network apparatus 10 such as a switching center.

In addition, with the mobile communication system according to the first embodiment of the present invention, when the frequency of the macrocell #1 is set to be the same as the frequency of the femtocell #A/#B, the mobile station UE located in the macrocell #1 can know the restricted processes in the femtocell #A/#B before transferring to the femtocell #A/#B.

With the mobile communication system according to the first embodiment of the present invention, the femtocell radio base station 20 performs restriction setting to restrict only the incoming and outgoing call processes and not to restrict the location registration process for a mobile station UE performing standby and belonging to a predetermined CSG in the femtocell radio base station 20. In this manner, the femtocell radio base station 20 can perform the incoming and outgoing processes while a mobile station located in the femtocell #20 arranged in the specific area, where the incoming and outgoing call processes are desired to be restricted, such as an area around a bank ATM, or an area inside an examination room, a hospital or a train car is forced to perform standby in the femtocell #20. Thus, it is possible to make the mobile stations located in the specific area restrict performing the incoming and outgoing call processes.

Note that, in this case, the mobile station located in the specific area is preferentially made to perform standby in the femtocell #20. Thus, the incoming and outgoing call processes performed via a macrocell by the mobile station in the specific area can be restricted as well.

In addition, with the mobile communication system according to the first embodiment of the present invention, the restricted processes can be set for mobile stations belonging to each CSG, for each femtocell. Thus, it is possible to achieve setting of flexible restricted processes in a predetermined cell. Examples of the flexible restricted processes include: allowing incoming and outgoing call processes for only a mobile station for which an extra communication fee is additionally paid; allowing communications only between mobile stations belonging to a certain CSG; and allowing incoming and outgoing call processes only between mobile stations of specific users such as immediate family members.

Aspects of the present embodiment described above may be expressed in the following manner.

A first aspect of the present embodiment is summarized as a mobile communication method including: a step A of setting a restriction type by the femtocell radio base station #A in response to input of predetermined information to the femtocell radio base station #A by the user (input of information by operating a predetermined screen, pressing a button or the like, for example), the restriction type indicating restricted processes to be applied to a mobile station UE belonging to the CSG #1 (first group) in the femtocell #A (first cell); a step B of notifying a mobile station UE in the femtocell #A of the set restriction type by the femtocell radio base station #A; and a step C of detecting processes restricted in the femtocell #A on the basis of the notified restriction type, in a case where the mobile station UE belongs to the CSG #1.

In the first aspect of the present embodiment, when detecting the macrocell #1 (second cell) under the control of the macrocell radio base station #1 (specific radio base station), the femtocell radio base station #A may set the frequency used in the macrocell #1 to be the frequency used in the femtocell #A.

In the first aspect of the present embodiment, in the step B, the femtocell radio base station #A may notify the mobile station UE of the aforementioned restriction type through broadcast information.

In the first aspect of the present embodiment, in the step A, the femtocell radio base station #A may not set location registration process as the aforementioned restricted process, and may notify the mobile station UE of the restriction type during location registration process in the step B.

In the first aspect of the present embodiment, in the step A, the femtocell radio base station #A may set incoming and outgoing call processes of circuit switch as the aforementioned restricted processes.

In the first aspect of the present embodiment, in the step A, the femtocell radio base station #A may set all the incoming and outgoing call processes except for the location registration process and the incoming and outgoing call processes for a specific communication destination, as the aforementioned restricted processes.

In the first aspect of the present embodiment, when detecting multiple cells including the femtocell #A, the mobile station UE may perform the location registration process preferentially to the femtocell #A.

In the first aspect of the present embodiment, different charge processes may be applied to a case where the mobile station UE performs the aforementioned restricted processes and to a case where the mobile station UE performs processes other than the aforementioned restricted processes.

In the first aspect of the present embodiment, the femtocell radio base stations #A and #B may notify mobile stations UE belonging to different groups CSG #1 and #2 in the femtocells #A and #B under the control of the femtocell radio base stations #A and #B of restriction types #A and #B indicating different processes, respectively.

A second aspect of the embodiment is summarized as the femtocell radio base station 20 including: the setting unit 21 response to input of predetermined information for the femtocell radio base station 20 by the user (input of information by operating a predetermined screen, pressing a button or the like, for example), the restriction type indicating restricted processes to be applied to a mobile station UE belonging to a predetermined CSG (first group) in a femtocell under the control of the femtocell radio base station 20; and the notification unit 22 configured to notify a mobile station UE located in the femtocell under the control of the femtocell radio base station 20 of the set restriction type.

In the second aspect of the present embodiment, the femtocell radio base station 20 may be configured to set, when detecting a macrocell (second cell) under the control of a macrocell radio base station (specific radio base station), the frequency used in the macrocell to be the frequency used in the femtocell under the control of the femtocell radio base station 20.

In the second aspect of the present embodiment, the notification unit 22 may be configured to notify the mobile station UE of the restriction type through broadcast information.

In the second aspect of the present embodiment, the notification unit 22 may be configured to notify the mobile station UE of the restriction type during location registration process in a case where the setting unit 21 does not set the location registration process as the aforementioned restricted process.

In the second aspect of the present embodiment, the notification unit 22 may be configured to notify a mobile station UE belonging to a different CSG in a femtocell under the control of the femtocell radio base station 20 of a restriction type indicating different restricted processes.

Note that, operation of the above described mobile station UE and femtocell radio base station 20 may be implemented by means of hardware, a software module executed by a processor, or a combination of both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE or the femtocell radio base station 20. Also, the storage medium and the processor may be provided in the mobile station UE or the femtocell radio base station 20 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
   a step A of setting a restricted process by a radio base station in response to input of predetermined information to the radio base station by a user, the restricted process being to be applied to a mobile station belonging to a first group in a first cell;
   a step B of notifying a mobile station located in the first cell of the set restricted process by the radio base station;
   a step C of detecting a process restricted in the first cell on the basis of the notified restriction type by the mobile station, in a case where the mobile station belongs to the first group; and
   a step D of, upon detection of a second cell under the control of a specific radio base station, setting by the radio base station a frequency used in the second cell as a frequency used in the first cell.

2. The mobile communication method according to claim 1, wherein, in the step B, the radio base station notifies the mobile station of the restricted process through broadcast information.

3. The mobile communication method according to claim 1, wherein,
   in the step A, the radio base station does not set a location registration process as the restricted process, and
   in the step B, the radio base station notifies the mobile station of the restricted process during the location registration process.

4. The mobile communication method according to claim 1, wherein, in the step A, the radio base station sets incoming and outgoing call processes of circuit switch as the restricted processes.

5. The mobile communication method according to claim 3, wherein, in the step A, the radio base station sets all incoming and outgoing call processes except for the location registration process and incoming and outgoing call processes for a specific communication destination as the restricted processes.

6. The mobile communication method according to claim 1, wherein, when detecting a plurality of cells including the first cell, the mobile station performs location registration process preferentially to the first cell.

7. The mobile communication method according to claim 1, wherein, different charge processes are applied to a case where the mobile station performs the restricted process and to a case where the mobile station performs a process other than the restricted process.

8. A radio base station comprising:
   a setting unit configured to set a restricted process in response to input of predetermined information to the radio base station by a user, the restricted process being to be applied to a mobile station belonging to a first group in a first cell;
   a notification unit configured to notify a mobile station located in the first cell of the set restricted process; and
   a restriction cell automatic setting unit configured to, upon detection of a second cell under the control of a specific radio base station, set a frequency used in the second cell as a frequency used in the first cell.

9. The radio base station according to claim 8, wherein the notification unit is configured to notify the mobile station of the restricted process through broadcast information.

10. The radio base station according to claim 8, wherein the notification unit is configured to notify the mobile station of the restricted process during location registration process in a case where the setting unit does not set the location registration process as the restricted process.

11. The mobile communication method according to claim 1, wherein the radio base station notifies mobile stations belonging to different groups in the same cell of different restricted processes.

12. The radio base station according to claim 8, wherein the notification unit is configured to notify mobile stations belonging to different groups in the same cell of different restricted processes.

* * * * *